No. 747,678. Patented December 22, 1903.

UNITED STATES PATENT OFFICE.

XAVIER BINDER, OF PARIS, FRANCE.

PROCESS OF MAKING MILK EXTRACT SIMILAR TO MEAT EXTRACT.

SPECIFICATION forming part of Letters Patent No. 747,678, dated December 22, 1903.

Application filed July 15, 1903. Serial No. 165,629. (No specimens.)

*To all whom it may concern:*

Be it known that I, XAVIER BINDER, a citizen of the French Republic, and a resident of Paris, France, have invented a new and useful Process of Making Milk Extract Similar to Meat Extract, of which the following is a specification.

It is well known that milk and meat contain many elements in common. It is therefore very rational to try to find a means for preparing a nutritive extract from milk alone which, by its similarities, reminds one of that of meat and in which the object of the present invention consists.

In order to manufacture this extract, it is necessary, first, to eliminate all fatty matter from the milk; secondly, to withdraw the proteid which is then rendered soluble; thirdly, to add to this proteid the salts of milk previously enriched with phosphated substances; fourthly, the whole is reduced to a syrupy consistence under the influence of a low temperature and slight pressure.

*Elimination of the fatty matter.*—It is absolutely necessary to free the milk used to prepare this extract from all fatty matter. This fatty matter when becoming rancid would injure the product or in any case would reduce its chances of keeping. The perfect separation is obtained by two consecutive passages in a centrifugal separator.

*The rendering soluble of the proteid.*—The proteid of milk is nearly totally composed of casein, which is precipitated by rennet or by means of an acid. The serum thus obtained gives up under the influence of heat the last traces of albuminous matter, generally called "albumen of milk." This albumen can be used conjointly with casein for the preparation of the extract. In order to render the proteid of milk soluble, it is treated by sulfuric acid diluted with water until a substance is obtained which cannot be precipitated by heat and which is perfectly dialyzable. In this manner a sort of peptone is obtained similar to that which results from the action of caseases or trypsin on casein of milk. After complete peptonization the sulfuric acid is precipitated by means of calcic carbonate, the syrupy liquid is poured off, and it is passed through a vacuum-filter.

*The addition of salts of milk.*—The salts of milk are contained totally in the lacteous serum. They are found therein associated with the lactose or sugar of milk. The latter is eliminated by crystallization, so that the remaining salts contain a small proportion of this element. During these operations it is of the highest importance to prevent lactic fermentation. This result is obtained by means of hydrogen peroxid. Some carbonate of potash is added as neutralizer to the salts freed in a great measure from sugar and diluted to four times their weight in water. The whole is boiled. Then by means of phosphoric acid a slight acid reaction is given. The peptonized portion is added to the whole, which is again boiled. During this ebullition the mixture is enriched with a small quantity of monopotassic phosphate (about ten per cent. of the saline totality) and it is clarified by passing through a filter-press.

*Concentration of the extract.*—It remains now to give the mixture a syrupy consistence. This is obtained in an apparatus wherein the evaporation is produced under a low pressure and at a temperature which must not exceed 50° centigrade.

Having now fully described my invention, what I claim, and desire to secure by Letters Patent, is—

A process of the nature herein set forth, which consists in adding sulfuric acid to milk and heating the same, whereby the albuminous portion is peptonized; then precipitating the sulfuric acid by adding calcium carbonate; eliminating the sugar of milk by crystallization, adding hydrogen peroxid to prevent fermentation during the preceding processes, then boiling the diluted salts and peptonized substances and adding thereto a small quantity of monopotassic phosphate during said boiling, substantially as herein described.

XAVIER BINDER. [L. S.]

In presence of—
ADOLPHE STURM,
J. ALLISON BOWEN.